United States Patent [19]

West

[11] Patent Number: 5,081,368

[45] Date of Patent: Jan. 14, 1992

[54] UNINTERRUPTIBLE POWER SUPPLY WITH A VARIABLE SPEED DRIVE DRIVING AN INDUCTION MOTOR/GENERATOR

[75] Inventor: Geoffrey West, Irvine, Calif.

[73] Assignee: Atlas Energy Systems, Inc., Irvine, Calif.

[21] Appl. No.: 463,440

[22] Filed: Jan. 11, 1990

Related U.S. Application Data

[63] Continuation-in-part of Ser. No. 344,682, Apr. 28, 1989, Pat. No. 5,053,635.

[51] Int. Cl.[5] .......................... H02J 9/04; H02P 5/41
[52] U.S. Cl. ........................ 307/67; 307/47; 307/66; 322/47
[58] Field of Search .............. 307/16, 18, 23, 25, 307/29, 43-48, 64-68, 72, 76, 80, 81, 84-87, 102, 120, 129; 322/47, 29-32

[56] References Cited

U.S. PATENT DOCUMENTS 3,665,495 5/1972 Carter et al. .................. 307/67
4,465,943 8/1984 Risberg ......................... 307/67

Primary Examiner—Todd E. Deboer
Assistant Examiner—David Osborn
Attorney, Agent, or Firm—Baker, Maxham, Jester & Meador

[57] ABSTRACT

An uninterruptible power source includes an induction motor/generator assembly and a continuously on line variable speed drive connected to inductively accelerate the motor/generator assembly to near rated speed. When the motor/generator assembly reaches rated speed, the motor/generator is switched to synchronous operation, while still under control of the variable speed drive. The variable speed drive includes slip compensation to maintain the motor at rated speed. The variable speed drive operates in response to a utility power signal and to a standby power signal. When the utility power signal fails, operation of the drive is maintained, without interruption, by the standby power.

5 Claims, 3 Drawing Sheets

UNINTERRUPTIBLE POWER SUPPLY WITH A VARIABLE SPEED DRIVE DRIVING AN INDUCTION MOTOR/GENERATOR

BACKGROUND OF THE INVENTION

This application is a continuation-in-part of U.S. patent application Ser. No. 07/344,682, filed Apr. 28, 1989, and entitled "UNINTERRUPTIBLE POWER SUPPLY WITH A VARIABLE SPEED DRIVE DRIVING A SYNCHRONOUS MOTOR/GENERATOR" now U.S. Pat. No. 5,053,635 issued Oct. 1, 1991.

This invention is in the field of uninterruptible power supply systems in which a motor/generator pair is operated to provide a multi-phase output power signal in response to a power signal derived from a main power source, or from a standby DC source when the MAINS are interrupted.

In the uninterruptible power source (UPS) art, it is known to provide a synchronous motor which is coupled to a synchronous generator and to drive the motor by a power arrangement which derives energy from a multi-phase utility power signal. When the utility (MAINS) power signal is interrupted, a standby battery circuit connected to the motor driving arrangement provides the energy to drive the motor. The changeover from the MAINS to the standby source must be fast enough to result in no interruption of motor/generator operation, thereby ensuring that the multi-phase load power signal derived from the generator is "uninterruptible" and within the requirements of the critical load.

In the prior art, arrangements for driving the synchronous motor/generator pair include UPS systems which employ "offline" inverters. When the MAINS power drops, the offline inverter is switched on to convert the DC power of a standby battery circuit to a multi-phase power signal which drives the motor. The offline inverter characteristically employs high-power semiconductor switches, such as SCRs, for power conversion. When switchover occurs from MAINS to standby power, the SCRs must be switched on. When switchover occurs, it is not uncommon for a cold SCR to fail catastrophically when suddenly energized with a high-magnitude power surge.

Typically, the off line inverter drives an induction motor after switchover. However, an induction motor exhibits "slippage", which is the difference between the speed of the induction motor, and the ideal motor speed ("rated speed") required to give the correct voltage/frequency characteristic to the multi-phase power signal output by the generator. Since an induction motor characteristically rotates with a speed somewhat lower than that required for ideal generator operation, an UPS system employing an induction motor normally gives marginal operation due to the motor's slippage.

SUMMARY OF THE INVENTION

This invention is based on the inventor's critical observation that use of a variable speed drive, including a three-phase inverter and a slip compensation component, in combination with a motor/generator pair which includes an induction motor can provide many benefits, when compared with the prior art described above. At system turn-on, the motor is operated conventionally in its induction mode to accelerate the motor/generator pair to near rated speed. As rated speed is approached the slip compensation component of the variable speed drive adjusts the motor drive signal to operate the motor at rated speed. Also, a DC power element in the variable speed drive which delivers the power signal converted by the converter can be fed both by the MAINS multi-phase power signal, as well as by the standby battery circuit. Thus, at switchover to standby when the MAINS fails, the inverter is on and operating. Resultantly, the switchover occurs without delay and without attenuation of the motor drive signal provided by the inverter.

The invention is expressed as an uninterruptible power source for producing a multi-phase output power signal at a rated frequency in response to an AC power signal provided by an AC power mains. The power source includes a standby source for providing a standby power signal and a power bus connected to the AC power mains and to the standby source for providing a power bus signal in response to the multi-phase AC power signal or in response to the standby power signal. A variable speed drive circuit provides a drive signal modulated to indicate a synchronous frequency. The variable speed drive circuit and the power bus are connected to a multi-phase inverter which provides a multi-phase motor drive signal at the synchronous frequency in response to the modulated drive signal and the power bus signal. An induction motor is connected to the multi-phase inverter for rotating at an actual frequency in response to the multi-phase motor drive signal. A generator is coupled to the induction motor for rotation by the motor. The generator produces a multi-phase output signal at the actual frequency in response to rotation by the motor. A load connection connected to the generator is provided for coupling the multi-phase output signal to a load. A switch connected to the mains, to the generator, and to the variable speed drive response to the condition of a first control signal by setting to a first state in which the multi-phase AC power signal is provided to the variable speed drive as the multi-phase power signal or setting to a second state in which the multi-phase output signal is provided to the variable speed drive as the multi-phase power signal. A controller connected to the induction motor and to the switch conditions the first control signal in response to rotation of the induction motor. Finally, a slip compensator in the variable speed drive circuit responds to the multi-phase output signal by adjusting modulation of the drive signal to change the synchronous frequency when the actual frequency deviates from the rated frequency.

Advantageously, UPS controller conditions the control signal to place the switch in the second state when the motor's rotation approaches a threshold speed.

A principal objective of this invention is, therefor, to provide an UPS system utilizing a motor which is driven during the entire UPS operation through an online inverter.

A related goal is to provide an UPS system utilizing an induction motor/generator pair to produce a multi-phase output power signal when driven by a variable speed drive connected to the MAINS utility input and to a standby source.

Other goals, objectives, and distinct advantages of this invention will be appreciated when the following detailed description is read in conjunction with the below-described drawings.

DESCRIPTION OF THE PREFERRED EMBODIMENTS

Figure 1:
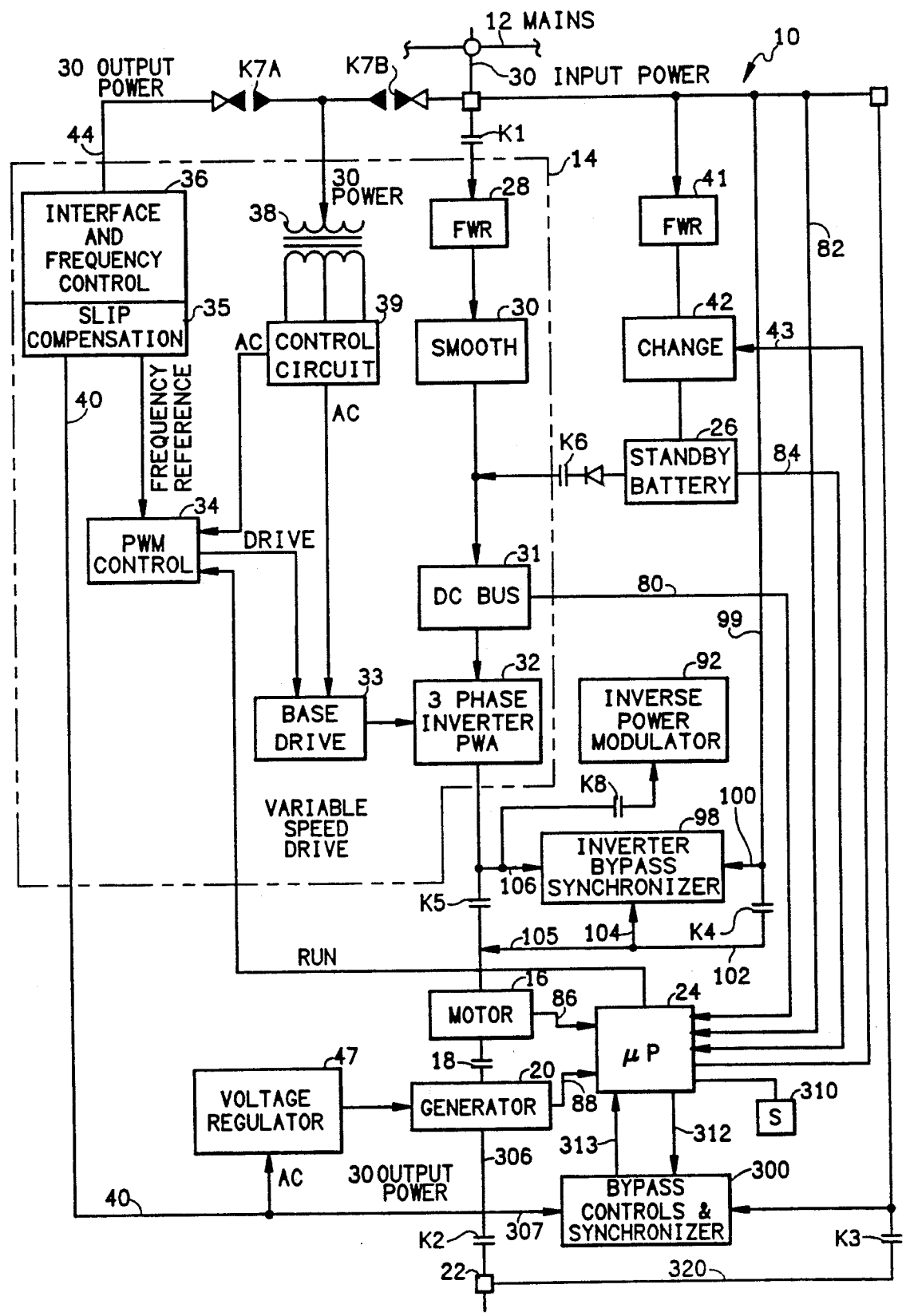
FIG. 1 is a block diagram of the novel UPS of the invention.

Refer to FIG. 1 for a complete representative illustration of a novel and unobvious uninterruptible power source (UPS) system, which embodies the below-claimed invention.

The UPS of this invention is indicated generally by reference numeral 10 in FIG. 1. The UPS 10 is fed a three-phase input power signal provided on a MAINS 12 from a utility power source (not shown). The UPS 10 includes a variable speed drive 14 connected to drive a motor/generator pair including an induction motor 16 connected by a coupling 18 to a generator 20. The variable speed drive provides a signal to rotate the motor 16, the rotation being mechanically coupled through a coupling 18 to turn the generator 20. Rotation of the generator 20 in response to rotation of the motor 16 generates a three-phase output power signal provided through an UPS output port 22. The UPS 10 has a microprocessor 24 conventionally programmed to execute an UPS control program to control startup, switchover, and other related functions of the UPS 10. The UPS 10 also includes a set of standby batteries 26 which provide DC power to the variable speed drive 14 upon failure of the three-phase input power signal from the MAINS 12.

With this complement of elements, the UPS 10 is enabled to provide the function required of any uninterruptible power source: the provision of a multi-phase output power signal from a rotating generator which is driven first by a signal derived from the input power signal, or from the standby source when the input power signal fails. This basic function ensures the uninterrupted provision of multi-phase power even in the face of failure of the primary source of multi-phase utility power.

The UPS three-phase output power signal is typically provided at a rated frequency. In most UPS, only a small variation in rated frequency can be tolerated before equipment failures ensue. For example, the input power frequency tolerance for a high-precision computer might be ±0.5 Hz for a 60 Hz power signal.

As disclosed above, the motor 16 is an induction motor. Characteristically, induction motors exhibit slip, which is directly related to the difference between the frequency of the AC input signal driving the motor and the speed of motor rotation in response to the input AC signal. Since the output of the UPS must be maintained at the rated frequency, the rotational frequency of the motor must be maintained at or very near the rated frequency. The slip of an induction motor means that the frequency of the input of the AC signal which drives the motor must be maintained at a value exceeding that of the rated frequency. However, as load conditions change, the amount of slip changes. Therefore, maintenance of the drive signal to the motor at a single frequency does not ensure that the UPS will provide output power at the rated frequency for all configurations of the load.

For example, many induction motors exhibit a slip of about 3%. Thus, if driven at no load by a 60 Hz drive signal, an induction motor would turn at 58.2 Hz, outside the tolerance of the computer. Even a low-slip motor exhibiting 1% slip would be out of the acceptable range.

In order to overcome the slip of the induction motor used in this invention, slip compensation is provided in the variable speed drive 14. This slip compensation senses motor speed from the output signal produced by the generator 20 and adjusts the drive signal which provides the primary rotary force for the motor 16 whenever the actual speed of the motor causes the output signal produced by the generator to deviate from the rated frequency.

In order to understand the invention, the structure of FIG. 1 is elaborated. The variable speed drive 14 includes first, a DC power circuit consisting of a full wave rectifier (FWR) 28 which feeds a smoothing capacitor circuit (SMOOTH) 30. The output of the circuit 30 is a rectified, smoothed DC power signal, which is fed to elements of the variable speed drive 14 through a conventional DC bus arrangement 31. The DC bus 31 outputs a highly stable DC power signal which is fed as one input to a speed drive control circuit including an inverter 32, a base drive circuit 33, a controller 34, a slip compensation component 35, and an interface and frequency control circuit 36. The inverter 32, which receives the D.C. power signals is a conventional three-phase inverter. The inverter also receives a frequency reference signal from the base drive circuit 33. In response to the frequency reference signal and to the DC power signal, the inverter circuit 32 operates conventionally to convert the DC power signal into a multi-phase, alternating-current (AC) signal which operates in this invention as the multi-phase motor drive signal provided to the motor 16. The base drive circuit is a conventional pulse-width modulating (PWM) circuit which operates in response to an AC power signal and a frequency reference signal (DRIVE). The DRIVE signal is obtained from the pulse width modulation control (PWM control) circuit 34, comprising a programmed micro-processor system which generates the DRIVE signal. In this regard, the DRIVE signal is a conventional digital waveform whose frequency is selectively variable by the PWM control 34. The PWM control 34 receives a frequency reference signal from the interface and frequency control circuit 36. The frequency reference signal is essentially a voltage level signal whose magnitude provides a reference to the PWM control 34. The PWM control 34 is conventionally designed and operated to convert a DC voltage signal to a frequency signal, the frequency signal being embodied in the DRIVE signal fed to the base drive 33. The frequency of the derived signal is directly related to the magnitude of the voltage level signal. The frequency reference is a signal derived from the slip compensation component of the frequency control 36 in response to the output of the generator 20. The three-phase output power signal is frequency-to-current converted by the frequency control circuit 36.

The conversion provides a current signal indicative of the secondary current of the motor. The secondary current of the motor is directly related to the motor's speed and, therefore, to the frequency of the output power signal produced by the generator 20. The slip compensation component 35 compares the indicated frequency with a programmed frequency range. If the converted current signal indicates that the actual speed of the motor is producing an output signal frequency outside of the programmed range, the slip compensation component will adjust the frequency reference signal provided to the PWM control 34 in a direction which will increase or decrease the speed of the motor 16 via the control path 34, 33, 32 until the motor speed is brought within the programmed range.

Thus, assuming the generator 20 is designed to provide the three-phase output power signal at the frequency with which it is rotated by the motor 16 when rotating at the rated frequency, conversion of its output power signal will result in the introduction of no compensation and provision of a frequency reference signal at a constant level. A change in the frequency of the three-phase output power signal, as would be caused by an alteration of motor speed when the load changes, will operate the slip compensation component 35 to adjust the frequency reference signal from a constant level, in the direction required, until the rated frequency is once again indicated. At this point, the frequency reference signal provided to the PWM 34 will be maintained at the new level necessary to keep the motor turning at the rated speed.

Figure 3:
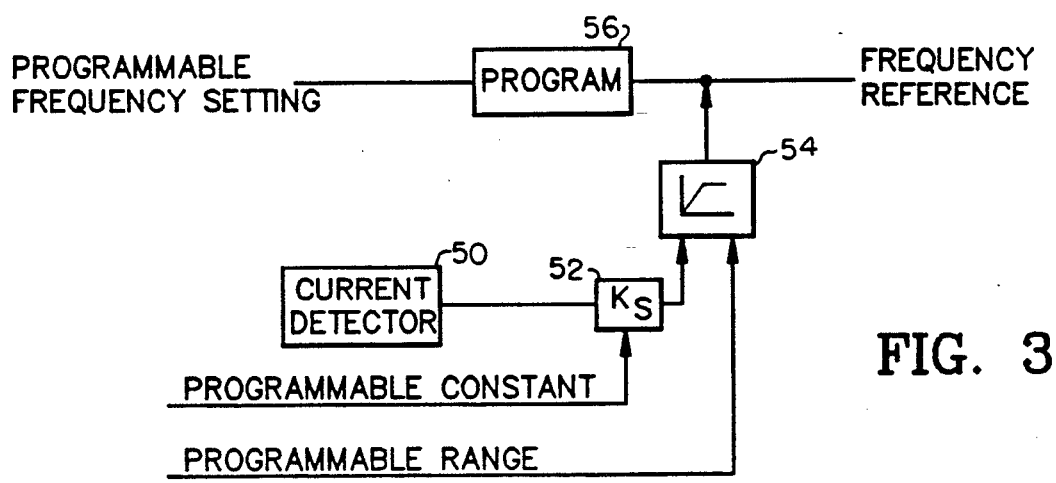
FIG. 3 illustrates in detail the slip compensation section of the variable speed drive in the UPS of FIG. 1.
Figure 4:
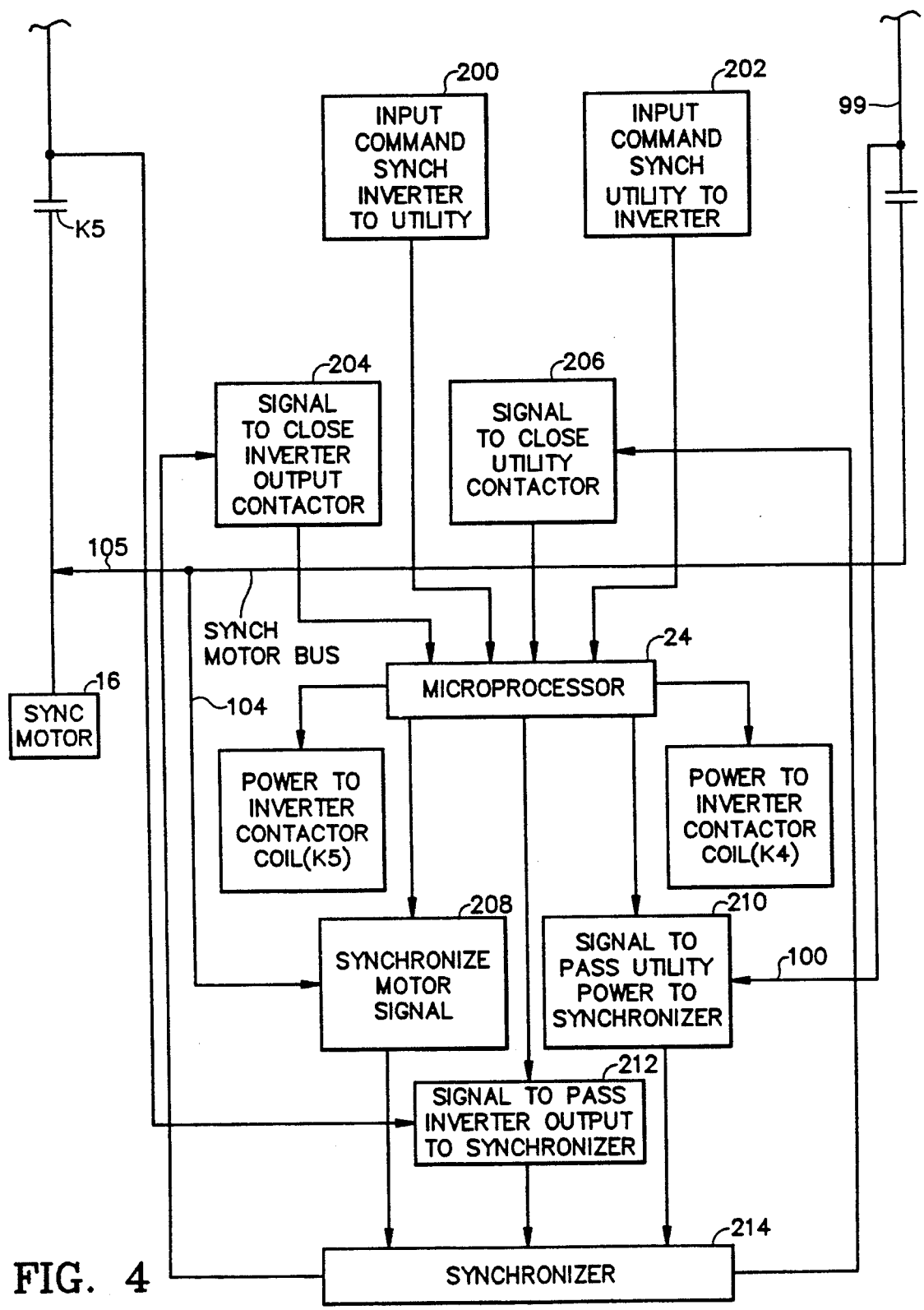
FIG. 4 is a combination block diagram and flow diagram illustrating details of operation of the UPS system of FIG. 1.

FIG. 3 illustrates in more detail, the slip compensation component of the variable speed drive. As shown in FIG. 3, the interface and frequency control 36 includes a conventional current detector which performs frequency-to-current conversion and outputs a signal indicative of the secondary current in the motor in response to the frequency of the output power signal. This signal is fed to the slip compensation component 35, which consists of programmable portions 52, 54 and 56. The programmable portion 52 multiplies the output of the current detector 50 by a slip compensation constant, and provides the scaled signal to a voltage-to-frequency limitation element 54. The element 54 applies the scaled signal to a window function which compares the scaled signal against a range of values. If the signal is outside of the range, the element 54 provides an adjustment signal having a polarity and a magnitude necessary to bring the scaled signal into the range. The adjustment signal is added to a frequency setting signal produced by programmable element 56. Frequency setting and adjustment signals, when combined, form the frequency reference signal.

Completing the description of the variable speed drive 14, power for the variable speed base drive circuit 33, 34, and 36 is obtained through a transformer 38 and a control and distribution circuit 39. The control and distribution circuit 39 provides an AC power signal to the PWM control 34 and to the base drive 33, which is converted in those elements by on-board power conversion circuitry to the DC power necessary to operate these circuit elements.

The final features of the variable speed drive 14 which are of interest to this invention include the provision of a RUN signal from the micro-processor 24 on signal line 24a to the PWM control circuit 34 and pass through the AC output power signal produced by the generator 20. The DRIVE signal initiates operation of the control circuit 34 when activated by the micro-processor 24. The multiphase output signal produced by the generator 20 is conducted on signal line 40 to the interface and frequency control circuit 36. The circuit 36 uses a portion of the signal to derive the 60 hertz reference signal. The remainder is passed through the circuit to signal line 41.

The standby battery circuit 26 in the UPS 10 is charged from the utility input from the MAINS 12 by way of a full wave rectifier 41 and a charge circuit 42, which together operate conventionally to charge the batteries in the standby battery circuit 26. Operation of the charging circuit 42 is initiated in response to a START signal received on signal line 43 from the micro-processor 24.

The motor/generator pair 16/20 has auxiliary control provided through voltage regulator 47. The voltage regulator 47 receive the multi-phase AC signal derived from the output of the generator 20 and provided on signal line 40. This signal is used conventionally by the voltage regulator 47 to establish the magnitude of the voltage output by the generator 20.

Figure 2:
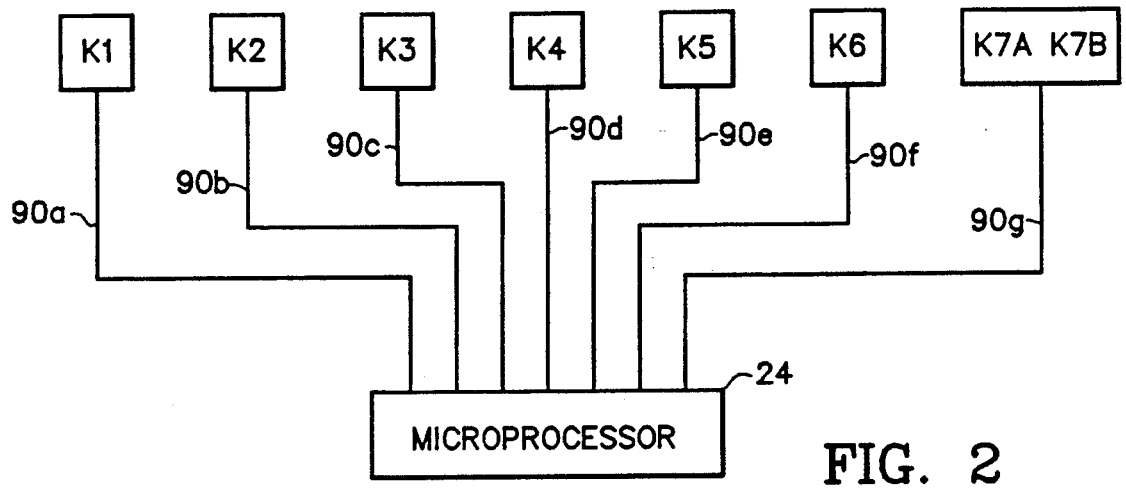
FIG. 2 illustrates a microprocessor interconnection with a set of switches in the UPS of FIG. 1.

Understanding of the operation of the UPS 10 will be complete when the connections of the micro-processor 24 are understood with reference to FIGS. 1 and 2. The micro-processor 24 receives on signal line 80 a signal from the DC bus 31 which indicates the level of DC power provided by the bus circuit 31. On signal line 82, a portion of the utility input derived from the MAINS 12 is conducted to the micro-processor 24. On signal line 84, the charge level of the standby battery circuit 26 is given. A signal proportional to the speed of the motor 16 is provided to the micro-processor 24 on signal line 86. A signal indicative of the voltage level and frequency of the output power signal produced by rotation of the generator 20 is conducted to the micro-processor 24 on signal line 88. Last, switch contacts K1, K2, K3, K4, K5, K6, and the double-pole switch contacts K7A and K7B, are all individually set by respective signals from micro-processor 24 provided on signal lines 90a-90g.

OPERATION OF THE PREFERRED EMBODIMENT

Drawing together now the representations of the invention given in FIGS. 1-3, the operation of the UPS 10 will now be explained in detail.

Initially, all of the contacts K1-K6 are open. Contacts K7A are closed and contacts K7B are open. Presuming availability and correct operation of the three-phase input power from the MAINS 12 and DC power from standby battery circuit 26, the automatic start/run sequence of the UPS 10 begins with detection of availability of the three-phase input power by the micro-processor 24 on signal line 82, following which the micro-processor 24 closes the contacts of the switch K1 by a provision of a signal on signal line 90a, allowing three-phase MAINS power to pass to the variable speed drive 14. At this time, the processor 24 provides a signal on signal line 90e to close the contacts of switch K5, which connects the output of three-phase inverter 32 to the synchronous motor 16. Last, the micro-processor 24 configures the double throw switch K7A and K7B to open the contacts K7A, and close the contacts K7B, thereby providing utility power to the transformer 38 to power the PWM controller 34 and base drive circuit 33. Closure of the K1 contacts provides three-phase power to the full wave rectifier 28. In a commercially available variable speed drive, the control circuit 39 after the initial receipt of power through the transformer 38 controls the smoothing circuit 30 to undergo a 15 second "walk in" condition, which builds up the charge on the smoothing capacitors in the circuit 30 before closure of a contact (not shown) in the variable speed drive 14 which passes full DC rectified power to the DC bus circuit 31.

After DC power is provided to the bus circuit 31, the control circuit 39 provides the AC waveforms to the base drive 33 and PWM control circuit 34. Upon initial receipt of the AC signal from the control circuit 39 and, assuming activation of the RUN signal by the micro-processor 24, the PWM control circuit 34 provides a DRIVE signal to the base drive 33 which ramps up in frequency, which in turn operates the inverter 32 to continuously increase the frequency of the multi-phase multi-drive signal to the motor 16. The motor 16 begins to rotate with an increasing frequency in response to the increasing frequency of the motor drive signal provided by the phase inverter 32.

As the rotation of the motor 16 accelerates from zero RPM toward near rated speed, the coupling 18 couples the rotation to the generator 20, thereby powering the generator field to ramp up the frequency and magnitude of the three-phase output power signal produced by the generator 20. As the output power signal increases, the reference signal provided by the frequency control circuit to the PWM control circuit 34 increases toward the voltage level corresponding to the rated frequency.

As the motor and generator 16 and 20 accelerate, their rotational speeds and the magnitude of the power output by the generator are provided to the micro-processor 24 on signal lines 86 and 88. When these signals indicate that the motor and generator have achieved rated speed, the micro-processor changes the contact configuration of the joint switch K7A and K7B to close the K7A contacts and open the K7B contacts. This disconnects the utility power signal provided by the MAINS 12 from the transformer 38 and substitutes the three-phase output power signal generated by the generator 20 and passed through the frequency control circuit 36 to the transformer by way of the closed K7B contacts. This action causes the speed drive control circuitry 32, 33, 34, 35, and 36 to disconnect from the utility power source and connect to the three-phase output power produced by synchronous generator 20. Although not illustrated, it is asserted that the capacitance of the speed drive control circuits provides the inertia necessary to damp the effect of changeover from MAINS to generator power effectively to zero.

With the motor 16 now operating at rated speed in response to the output of the inverter 32, the synchronous generator produces a three-phase output power signal whose voltage and frequency are within required limits. Now, the micro-processor 24 closes the contact K2 via signal line 90b, which, in turn, applies the generator output to the output node 22.

Assuming now that the micro-processor detects adequate standby power in the battery circuit 26 (on signal line 84), the K6 contacts are closed by the micro-processor 24 on signal line 90f, thereby connecting the standby battery circuit to the input of the DC bus circuit 31. Now, the processor 24 activates the charge circuit 42 via signal line 43 and battery charging takes place from the MAINS utility input.

The UPS 10 is now running and on line.

Assume now that there is a loss of MAINS power input, resulting in removal of the three-phase input power signal from the full wave rectifier 28 in the variable speed drive. Loss of this signal is sensed on signal line 82 by the processor 24. In response to loss of the main AC input signal, the processor 24 opens the K1 contacts. The operation of the motor 16 continues under power of the standby batteries through the DC bus circuit 31. The speed drive controls 32, 33, 34, 35, and 36 in the variable speed drive 14 are powered by the output of the synchronous generator 20. Thus, switchover is accomplished without having to switch on the inverter 32.

If utility power does not return within a predetermined amount of time equal to the duration of the standby battery power, then the processor 24 will shut the system down by opening contacts K1, K7A, K2, K5, and K6.

If utility power returns prior to standby battery power depletion, then the processor 24 closes the contacts K1, allowing utility power to once more drive the system through the variable speed driver 14. The standby batteries automatically go into a charge mode in preparation for the next utility power failure.

Preferably, the micro-processor 24 is powered initially from the utility power source 12, but after the UPS 10 is running at synchronous speed, the power source is switched from the MAINS 12 to the synchronous generator 20. This is not illustrated, but is well within the ability of the skilled artisan to implement.

ANCILLARY FUNCTIONS AND OPERATIONS

Assuming normal operation and full loading of the UPS 10 through the output connector 22, it is assumed that the load is suddenly removed from the connector 22. As is known, upon shedding a full load, a reverse power condition might be evidenced by the motor 16, resulting in transfer of an EMF back to the inverter 32. Failure to eliminate this reverse power condition can damage the speed drive circuitry 32, 33, 34, 35, and 36 to shut down, or can result in an over-voltage condition measured at the DC bus circuit 31. Normally, detection of reverse power loading or over-voltage on the DC bus would shut the variable speed drive 14 down via internal controls which are not shown. The micro-processor 24 senses this condition on the signal line 86 and, to alleviate its effects, closes the contacts of switch K8, which delivers the reverse-loaded power to an inverse power modulator 92. The inverse power modulator 92 operates to receive and expend the reverse-loaded power, thereby removing it from the output ports of the inverter 32, and preventing shut-down of the variable speed drive 14.

Last, refer now to FIG. 1 where a by-pass control and synchronizer circuit 300 is connected to the MAINS power by signal path 301, 302 and to the output of the generator by signal path 306, 307. When manual switch 310 is closed, the micro-processor 24 signals the circuit 300 to synchronize the AC signals on signal lines 302 and 307. When synchronization is detected, the circuit 303 provides a signal on signal line 313 to the micro-processor 24. In response to the signal, the micro-processor 24 will close the contact K3 and open the contact K2. This disconnects the entire UPS 10 from the load, while providing as the output signal, the input power signal derived from the MAINS by signal path 301, K3, 320, 22. This permits the UPS 10 to be repaired, maintained, or replaced. When the UPS 10 is to be once again operated to provide the three phase conditioned load signal through the connector 22, the UPS 10 is powered up, the motor/generator pair 16, 20 is brought to rated speed, and the switch 310 is opened. When the switch 310 is opened, the micro-processor 24 provides a synchronization request signal on the signal line 312, in response to which the circuit 300 watches the phases of the output of the generator 20 and the MAINS power signal. When synchronization is detected, a synchronization signal is passed back on signal line 313 to the micro-processor 24 in response to which, the micro-processor opens the contact K3 and closes the contact K2, resulting in switch-over of three phase condition load power without interruption of phase, frequency, or magnitude of the output power signal.

Although the prior art provides an abundance of examples and availability of many of the individual elements described above, it does not provide them in precisely the operative interconnection illustrated in FIGS. 1-4. Variable speed drives corresponding to that described are obtainable by modification of equipments available from the Yaskawa Electric Manufacturing Company, Ltd., having offices in Tokyo, Japan and Los Angeles, Calif., USA. An exemplary Yaskawa variable speed drive is the VS-616HII. Generators of the kind described above are available, for example, from Kato Engineering, Mankato, Minn. Induction motors are available from Marathon Electric, Balder Electric, and Reliance Electric.

The slip compensation arrangement of FIG. 3 is available from Yaskawa Electric in the form of a memory module model JOHB-C03. This module is programmable by way of a Yaskawa Electric programming operator component, Model JVOP-73. Further descriptions of these components are available in Yaskawa publications TOE-C736-5 entitled "Memory Modules Instruction Manual", and TOE-C730-40.5B entitled "Programming Operators Instruction Manual". The current detector is included in a transistor inverter available from Yaskawa Electric and described in Yaskawa publication TOE-S616-40.8 entitled "Varispeed-616HII Instruction Manual".

While I have described a preferred embodiment of my uninterruptible power source, it should be understood that modifications and adaptations thereof will occur to persons skilled in the art. Therefore, the protection afforded my invention should only be limited in accordance with the scope of the following claims.

I claim:

1. An uninterruptible power source for producing a multi-phase output power signal at a rated frequency in response to a multi-phase AC power signal provided by an AC power mains, the uninterruptible power source comprising:
   a standby source for providing a standby power signal;
   power bus means connected to said AC power mains and to said standby source for providing a power bus signal in response to said multi-phase AC power signal or in response to said standby power signal;
   a variable speed drive circuit which provides a drive signal modulated to indicate a synchronous frequency in response to a multi-phase power signal;
   a multi-phase inverter connected to said variable speed drive circuit and to said power bus means for providing a multi-phase motor drive signal at said synchronous frequency in response to said modulated drive signal and said power bus signal;
   an induction motor connected to said multi-phase inverter for rotating at an actual frequency in response to said multi-phase motor drive signal;
   a generator coupled to said induction motor for rotation by said induction motor, said generator producing a multi-phase output power signal at said actual frequency in response to rotation by said synchronous motor;
   a load connection connected to said generator for coupling said multi-phase power output signal to a load;
   a switch connected to said mains, said generator, and said variable speed drive, said switch responsive to the condition of a first control signal for being set to a first state in which said multi-phase AC power signal is provided to said variable speed drive as said multi-phase power signal, and to a second state in which multi-phase power output signal is provided to said variable speed drive as said multi-phase power signal;
   control means connected to said synchronous motor and to said switch for conditioning said first control signal in response to rotation of said synchronous motor; and
   slip compensation means in said variable speed drive circuit and responsive to said multi-phase power output signal for adjusting modulation of said drive signal to change said synchronous frequency when said actual frequency deviates from said rated frequency.

2. The uninterruptible power source of claim 1, wherein said control means conditions said control signal to place said switch in said second state in response to said rotation substantially equalling said rated speed.

3. The uninterruptible power source of claim 1, wherein said control means conditions said control signal to place said switch in said first state in response to said rotation being less than said rated speed.

4. The uninterruptible power source of claim 1 wherein said control means produces a second control signal conditioned to indicate output power switching and said uninterruptible power source includes an output by-pass means connected to said control means, to said generator, to said load connection and to said mains for substituting said multi-phase AC power signal for said multi-phase power output signal at said load connection in response to said second control signal.

5. An uninterruptible power source for connection to an AC power utility which generates an AC utility power signal, said uninterruptible power source for generating an output AC power signal at a rated frequency, said uninterruptible power source comprising:
   a source of standby DC power;
   a variable speed drive including an online inverter coupled to said utility and to said source of standby DC power for providing a variable-frequency drive signal in response to said utility AC power signal during provision of said utility Ac power signal by said AC power utility and to said standby DC power during interruptions of said utility AC power signal;
   a slip compensation circuit in said variable speed drive and connected to said inverter for changing the frequency of said drive signal in response to deviation of a frequency of a speed indication signal from said rated frequency;
   a motor/generator assembly connected to said inverter for producing an AC output power signal in response to said variable-frequency drive signal, said AC output power signal having frequency characteristics determined by rotation of said motor/generator assembly, said rotation of said motor/generator assembly being at a speed corresponding to said frequency characteristics; and output means connected to said variable speed drive and to said motor/generator assembly for providing said AC output power signal to said slip compensation circuit as said speed indication signal.

* * * * *